United States Patent [19]
Yoshida et al.

[11] Patent Number: 4,729,618
[45] Date of Patent: Mar. 8, 1988

[54] INTEGRATED OPTIC CIRCUIT

[75] Inventors: Ken-ichi Yoshida; Yoshikazu Nishiwaki, both of Osaka, Japan

[73] Assignee: Sumitomo Electric Industries, Ltd., Osaka, Japan

[21] Appl. No.: 576,483

[22] Filed: Feb. 2, 1984

[30] Foreign Application Priority Data

Feb. 4, 1983 [JP]  Japan .................................. 58-17240

[51] Int. Cl.[4] ............................................. G02B 6/12
[52] U.S. Cl. ................................ 350/96.11; 350/96.12
[58] Field of Search ............... 350/96.11, 96.12, 96.13, 350/96.14

[56]  References Cited
U.S. PATENT DOCUMENTS

| | | | |
|---|---|---|---|
| 4,005,927 | 2/1977 | Caton ...................... | 350/96.14 |
| 4,144,503 | 3/1979 | Itoh et al. ................ | 350/96.12 X |
| 4,152,044 | 5/1979 | Liu .......................... | 350/96.11 X |
| 4,166,669 | 9/1979 | Leonberger et al. ..... | 350/96.14 |
| 4,203,649 | 5/1980 | Velasco et al. .......... | 350/96.14 |
| 4,211,467 | 7/1980 | Cross et al. ............. | 350/96.14 |
| 4,251,130 | 2/1981 | Marcatili ................. | 350/96.14 |

FOREIGN PATENT DOCUMENTS

| | | | |
|---|---|---|---|
| 2205728 | 8/1973 | Fed. Rep. of Germany . | |
| 2619269 | 11/1976 | Fed. Rep. of Germany . | |
| 0158617 | 9/1982 | Japan ....................... | 350/96.14 |
| 0173803 | 10/1982 | Japan ....................... | 350/96.11 |
| 1407544 | 9/1975 | United Kingdom ..... | 350/96.11 |

OTHER PUBLICATIONS

"Flip-Chip Approach to Entire Coupling Between Single Mode Optical Fibers and Channel Waveguides", by Electronics Letters, Hsu et al, vol. 12, No. 16, 5th Aug. 1976 (pp. 404–405).

"Optical Waveguide in GaAs-AlGaAs Epitaxial Layers", by Logan et al, J. Appl. Phys., vol. 44, No. 9, Sep. 1973.

"Chemical Etching of InP and GaInAsP for Fabricating Laser Diodes & Integrated Optical Circuits", by Kambayash, Japanese Journal of Applied Physics, vol. 19, No. 1, Jan. 1980, pp. 79–85.

*Primary Examiner*—William L. Sikes
*Assistant Examiner*—Akm E. Ullah
*Attorney, Agent, or Firm*—Cushman, Darby & Cushman

[57]  ABSTRACT

An integrated optic circuit according to the present invention is produced as a hybrid integrated optic circuit using two or more kinds of substrates in which only the portion of high performance and high degree of integration is formed of the substrate of a material of high cost and high performance while the other portion of lower degree of integration is formed of the substrate of a material of low cost. Therefore, in the integrated optic circuit according to the present invention, the distance between the waveguides to be coupled with optical fibers can be larger than the outside diameter of the optical fiber, and the integrated optic circuit according to the present invention can be produced easily at low cost.

10 Claims, 5 Drawing Figures

INTEGRATED OPTIC CIRCUIT

FIELD OF THE ART

The present invention relates to an integrated optic circuit and, more particularly, to a circuit improved to reduce its production cost.

PRIOR ART

A typical example of a conventional waveguide type optical functional device is shown in FIG. 1. As shown, this optical functional device utilizes the phenomenon of directional coupling between two waveguides 1 and 2. Therefore, if a material having an electrooptic effect is used as a substrate 3, the optical functional device can be a switching device or a modulation device by changing the voltage applied to the waveguides 1 and 2, and controlling the phase constant thereof. Said waveguides 1 and 2 are of a single mode type having a width on the order of several to several tens $\mu$m, and the distance between them is of the like size. On the other hand, in the case where said optical functional device is used as a switching device in an optical fiber communication system, it is impossible to couple a pair of the optical fibers directly to the terminals of the waveguides 1 and 2 of the optical functional device shown in FIG. 1 because the typical outside diameter of the optical fiber is 125 $\mu$m. Accordingly, it has been a general practice to provide bends as in waveguides 4 and 5 shown in FIG. 2 and to extend them such that the distance between the ends of the waveguides 4 and 5 becomes approximately the outside diameter of optical fibers 6, 6a, 7 and 7a, thereby coupling the optical fibers directly to the ends of the waveguides, respectively.

The technical art of coupling optical fibers directly to the substrate of an integrated optic circuit is disclosed in each of an article by H. P. Hsu and A. F. Milton, entitled "Single-mode coupling between fibers and indiffused waveguides", IEEE Journal of Quantum Electronics, vol. QE-13, pp. 224-233, April, 1977 and an article by O. G. Ramer, C. Nelson, and C. Mohr, entitled "Experimental Integrated Optic Circuit Losses and Fiber Pigtailing of Chips", IEEE Journal of Quantum Electronics, vol. QE-17, No. 6, June, 1981.

However, the conventional technical art mentioned above has disadvantages as follows:

(1) The optical functional device thus produced becomes inevitably high in price for the following reason. That is, the smaller the radius of curvature of the bent waveguides, the larger the propagation loss thereof becomes. Therefore, the larger radius of curvature to minimize the propagation loss necessitates a larger total length l of the waveguides 4 and 5 to secure a sufficiently large distance between the waveguides (see FIG. 2) and this fact, coupled with the fact that materials having electrooptical effect used to form a switching device, such as single crystals of each of InP, GaAs and $Bi_{12}SiO_{20}$ are generally high in price, results in a rise in price of the optical functional devices of this kind.

(2) As a result, the optical functional device thus produced becomes large in size. This involves technical difficulties. For example, in the case where the waveguides 4 and 5 are produced by epitaxial growth, it is difficult to obtain a uniform epitaxial layer over a large area.

SUMMARY OF THE INVENTION

An object of the present invention is to provide an integrated optic circuit which is produced easily and at a low cost.

According to the present invention wherein only the functional block of high performance and high degree of integration of the integrated optic circuit is formed of a high cost and high performance substrate material such as InP or GaAs while the other portions of a relatively low degree of integration such as the bent waveguides are formed of a low cost substrate material. It is possible to produce at a low cost an integrated optic circuit of a large size in which the distance between waveguides to be coupled to optical fibers can be sufficiently large.

BRIEF DESCRIPTION OF THE DRAWINGS

The present invention will be better understood from the following description taken in connection with the accompanying drawings in which.

DESCRIPTION OF THE PREFERRED EMBODIMENTS

Preferred embodiments of the present invention will now be described in detail with reference to the drawings.

Figure 3:
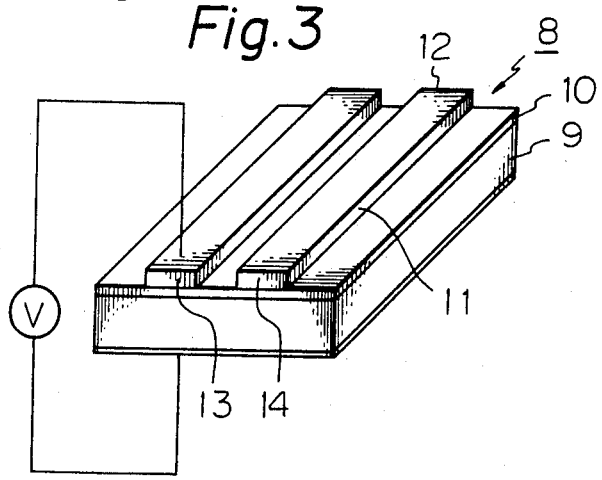
FIG. 3 is a perspective view of an optical functional device of an integrated optic circuit according to the present invention.

In an integrated optic circuit in which optical functional devices such as laser diodes LD, photo diodes PD, modulators, multiplexers and so forth are integrated on a single substrate, the distance between the waveguides becomes smaller as the degree of integration becomes higher. On the other hand, an optical fiber is standardized to have an outside diameter of 125 $\mu$m. Therefore, it is physically impossible to couple a plurality of pieces of optical fibers to an integrated optic circuit having a plurality of waveguides with a small distance therebetween. FIG. 3 shows an optical switching device which is an optical functional device of this kind. As shown in FIG. 3, in the switching device which is an optical functional device 8 of this example, an n-InGaAsP as a guide layer 10 and p-InP or p-InGaAsP as a clad layer on which an electrode layer 12 is formed are fabricated on an n-InP substrate by epitaxial growth, and, thereafter, etching them in the construction shown in FIG. 3 to form strip-loaded type waveguides 13 and 14. In this case, if the distance between the waveguides 13 and 14 is made smaller, there occurs the phenomenon of directional coupling in which a light incident to one waveguide 13 couples into the other waveguide 14. The complete coupling length, that is the distance required for the 100% coupling of the energy, becomes smaller as the distance between the waveguides 13 and 14 becomes smaller. When an electric field is applied only to one waveguide 13 of a switching device having the length equal to the complete coupling length, the refractive index of the waveguide 13 is changed by the electrooptic effect of InP, to thereby generate a differential phase constant $\Delta\beta$ between the waveguides 13 and 14. When a voltage V equal to $$\Delta\beta = \sqrt{\frac{3\pi}{L}}$$

(L: complete coupling length) is applied, the energy of the light once coupled to the other waveguide 14 is returned to the waveguide 13. That is, switching is accomplished by controlling the applied voltage V.

Figure 1:
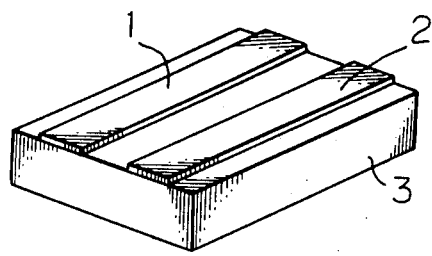
FIG. 1 is a perspective view of an optical functional device.
Figure 2:
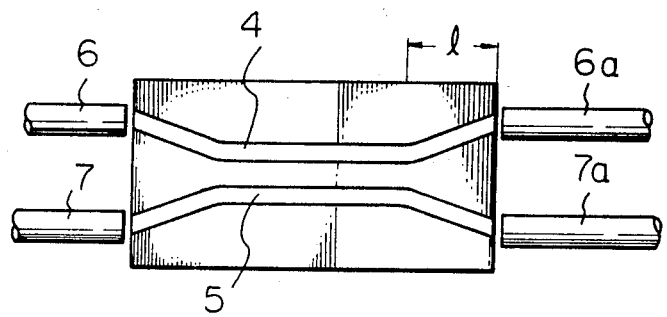
FIG. 2 is a plane view of an optical functional device having conventional waveguides and optical fibers.

In this case, it is essential that the waveguides 13 and 14 are single-mode guides. For this reason, each of the width and thickness of the waveguides is of the order of several $\mu$m. Further, in order to make the complete coupling length (length of device) on the order of several mm, it is essential that the distance between the waveguides 13 and 14 is on the order of several $\mu$m. Accordingly, it is physically impossible to couple optical fibers having the outside diameter of 125 $\mu$m directly to the waveguides 13 and 14, respectively. For this reason, it was the conventional practice to form the bent waveguides 4 and 5 as shown in FIG. 2. This, however, was not free from the disadvantages described hereinabove.

Figure 4:
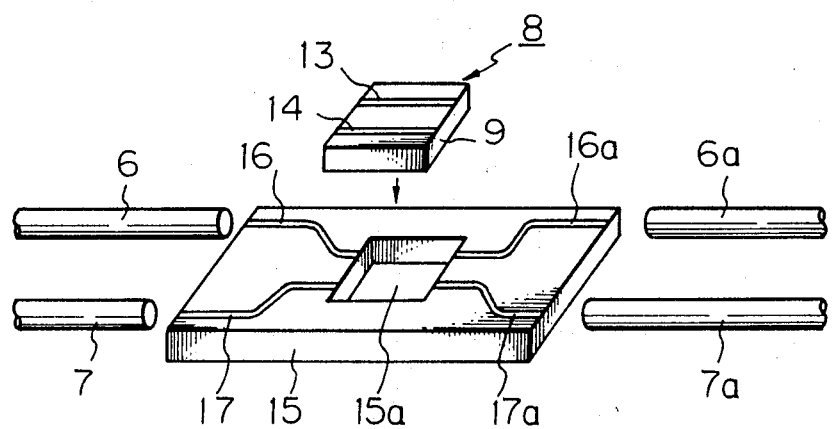
FIG. 4 is a perspective view of an embodiment of the integrated optic circuit according to the present invention.

In the preferred embodiment of the present invention, the bent portions of the waveguides 4 and 5 shown in FIG. 2 are formed using a substrate material which is low in cost and on which it is easy to make the waveguides. That is, as shown in FIG. 4, a substrate 15 is provided with a receptacle 15a which is a recess formed by etching for receiving an optical functional device 8 which is a switching device, and is formed thereon with waveguides 16, 16a and 17, 17a the ends of which are coupled with the optical functional device 8 while the other ends of which are coupled to the optical fibers 6, 6a and 7, 7a. The distance between the waveguides 16, 16a and 17, 17a is made smaller toward the optical functional device 8 from the ends opposite to the optical fibers 6, 6a and 7, 7a. A single crystal material of, for example, GaAs, InP, Si, $Bi_{12}SO_2$, $LiNbO_3$ and so forth can be used as the substrate 9 of the optical functional device 8. In the case where a compound semiconductor such as GaAs, InP and so forth is used, LED, PD, FET and so forth can be integrated thereon. If $LiNbO_3$ is used as the substrate 9 on which Ti is coated in the pattern of the waveguides and heat-treated in the neighborhood of 1000° C. for four to five hours, the optical functional device 8 can be a directional coupling device comprising the waveguides 13 and 14 in which Ti is diffused. Further, if GaAs is used as the substrate 9 on which $Ga_xAl_{1-x}As$ is coated by epitaxial growth changing the value of x, and the upper layer $Ga_{x'}Al_{1-x'}As$ of $Ga_xAl_{1-x}As$ and $Ga_{x'}Al_{1-x'}As$ (where $x'>x$) coated on the GaAs substrate sequentially by epitaxial growth is etched to form the waveguides 13 and 14, the optical functional device 8 can be a directional coupling device. Further, if InP is used as the substrate 9 on which $In_xG_{1-x}A_yP_{1-y}$ is coated by epitaxial growth changing the values of x and y, and the upper layer $In_{x'}G_{1-x'}A_{y'}P_{1-y'}$ of $In_xG_{1-x}A_yP_{1-y}$ and $In_{x'}G_{1-x'}A_{y'}P_{1-y'}$ (where $x'>x$, $y'>y$) coated on the InP substrate by epitaxial growth sequentially is etched to form the waveguides 13 and 14, the optical functional device 8 can be a directional coupling device. Still further, if pyrex glass is used as the substrate 15 the upper surface of which except the receptacle 15a and the waveguides 16, 16a, 17 and 17a is masked by gold and the substrate 15 is heated in a solution consisting of 85% $KNO_3$ and 15% $TlNO_3$ at 400°-500° C. for diffusion, the waveguides 16, 16a, 17 and 17a can be formed thereon. The groove of the receptacle 15a is etched preferably by chemical etching with hydrogen fluoride.

Figure 5:
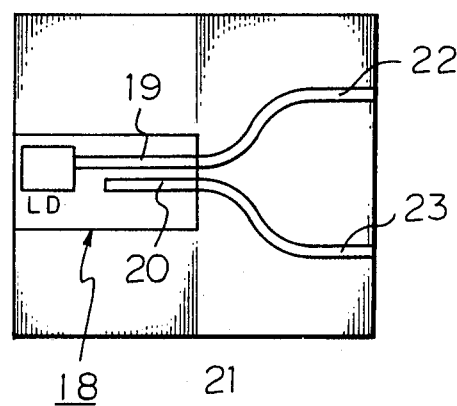
FIG. 5 is a plane view of another embodiment of the integrated optic circuit according to the present invention.

FIG. 5 shows an example in which laser diodes are integrated. The optical functional device 18 shown in FIG. 5 is a transmitter for switching the output of the LD to waveguides 19 and 20 consisting of two pieces of optical fibers. A substrate 21 has said waveguides 19 and 20 coupled thereto forming waveguides 22 and 23 widening toward the end thereof opposite the optical functional device.

The substrates 15 and 21 and the waveguides 16, 16a, 17, 17a, 19 and 20 may be formed by coating a quartz substrate with Ge doped $SiO_2$ by CVD and etching it.

As described above with reference to preferred embodiments, according to the present invention having its technical thought based on a hybrid integrated optic circuit using two or more kinds of substrates, it is made possible to produce an integrated optic circuit having a sufficient distance between waveguides to be coupled with optical fibers at low cost.

While only the preferred forms of the invention have been described and shown, it should be understood that various changes or modifications may be made within the scope of the appended claims without departing from the spirit of the present invention.

What is claimed is:

1. An integrated optic circuit comprising:
    an optical functional device comprising a first substrate made of a first material and, a plurality of first waveguides formed on said first substrate,
    a base portion comprising a second substrate made of a second material different from said first material, said second substrate having a recess for receiving said first substrate and, a plurality of second waveguides formed on said second substrate, each of said second waveguides having an inner end and a distal end, and
    a plurality of optical fibers, each of said fibers having a diameter D,
    wherein each waveguide inner end is coupled by one of said first waveguides and each waveguide distal end is coupled to an end of one of said optical fibers, said first waveguides are spaced apart a distance less than D and, said second waveguides at said distal end are spaced apart a distance greater than D.

2. An integrated optic circuit as in claim 1, wherein said first material comprises $LiNbO_3$, and said first waiveguides comprise Ti,
    whereby said optical functional device can operate as a directional coupling device.

3. An integrated optic circuit as in claim 1, wherein said first material comprises GaAs, and $Ga_xAl_{1-x}As$ is formed on said first substrate,
    whereby said optical functional device can operate as a directional coupling device.

4. An integrated optic circuit as in claim 1, wherein said first material comprises InP, and $In_xG_{1-x}A_yP_{1-y}$ is formed on said first substrate,
    whereby said device can operate as a directional coupling device.

5. An integrated optic circuit as in claim 1, wherein said second material comprises pyrex glass, and said second waveguides comprise $KNO_3$ and $TlNO_3$.

6. An integrated optic circuit as in claim 1, wherein said first material comprises $LiNbO_3$, and wherein Ti is coated on said first substrate and heated at about 1000° C. for about 4–5 hours to diffuse Ti to form said plurality of first waveguides,
   whereby said optical functional device can operate as a directional coupling device.

7. An integrated optic circuit as in claim 1, wherein said first material comprises GaAs, and $Ga_xAl_{1-x}As$ is formed on said first substrate by epitaxial growth, changing the value of x, and said plurality of first waveguides are formed by etching,
   whereby said optical functional device can operate as a directional coupling device.

8. An integrated optic circuit as in claim 1, wherein said first material comprises InP, and $In_xG_{1-x}Ay P_{1-y}$ is formed on said first substrate by epitaxial growth, changing the values of x and y, and said plurality of first waveguides are formed by etching,
   whereby said device can operate as a directional coupling device.

9. An integrated optic circuit as in claim 1, wherein said second material comprises pyrex glass, and said second waveguides are formed by masking a top side of said second substrate except said recess and an area on which to form said second waveguides, and heating said masked substrate in a solution of about 85% $KNO_3$ and 15% $TlNO_3$ at a temperature high enough to diffuse $KNO_3$ and $TlNO_3$.

10. An integrated optic circuit as in claim 1 wherein said recess is formed by chemical etching with HF.

* * * * *